Figure 1:
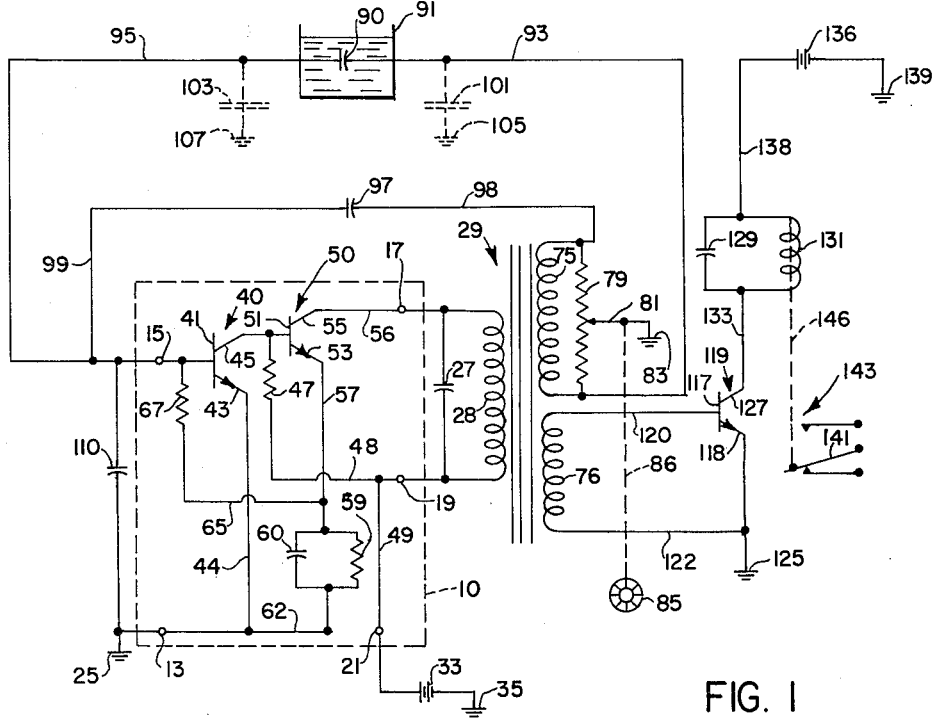

July 3, 1962 R. P. PEARSON 3,042,908
FLUID LEVEL SENSOR
Filed Sept. 2, 1959

INVENTOR
ROBERT P. PEARSON

BY Charles J. Ungemach

ATTORNEY

United States Patent Office 3,042,908
Patented July 3, 1962

---

3,042,908
FLUID LEVEL SENSOR
Robert P. Pearson, St. Paul, Minn., assignor to Minneapolis-Honeywell Regulator Company, Minneapolis, Minn., a corporation of Delaware
Filed Sept. 2, 1959, Ser. No. 837,748
14 Claims. (Cl. 340—244)

This invention is concerned with fluid level sensing systems, and more particularly with a capacitive type liquid level switch which operates on a change in impedance of a capacitor as the dielectric between the electrodes changes.

The change of impedance which a capacitor experiences as the dielectric between its electrodes changes from a fluid being sensed to air or vice versa has long been used for the determination of fluid level. Frequently such systems employ an oscillator the LC circuit of which includes the sensing capacitor. The change of impedance of the sensing capacitor is used to tune the LC circuit to a frequency which may either cause oscillation or stop oscillation of the system as an indication of fluid level. A major problem arises in the use of such systems when the sensing capacitor must be located at a point remote from the rest of the system because the long connecting wires thereto form a considerable capacitance to ground in shunt with the sensing capacitor. This capacitance is subject to changes which may cause alteration of the sensing point and thus produce false indications.

A capacitance bridge arrangement, such as that shown in the C. R. Schafer et al. Patent No. 2,563,280 and sometimes called a three wire bridge, provides circuitry which virtually removes the limitations on cable length experienced with the oscillator systems. In such a bridge, the sensing capacitor is provided with a fixed alternating voltage of a first phase and is connected to the input of an amplifier. A reference capacitor is provided with an alternating voltage of phase opposite the first phase and is also connected to the input of the amplifier. At a balanced condition, the magnitude of the signals from the sensing capacitor and the reference capacitor are the same and since they are oppositely phased, no net signal is received by the amplifier. Any extra capacitance produced by the connecting wires to the sensing capacitor is not in shunt with the sensing capacitor but rather in parallel with the input to the amplifier and the source of voltage applied to the sensing capacitor. As such, any changes in the lead wire capacitance do not change the impedance of the circuit but merely affect the sensitivity of the system. Thus, the balance point is substantially independent of the lead wire capacitance to ground and accurate indication is provided.

One feature which is sometimes undesirable in a three wire bridge circuit is the necessity for an alternating voltage source. In some applications, an alternating source is not available and an oscillator circuit using only a direct current source is desirable.

The present invention has as an object the provision of an oscillator type circuit which needs only a direct current source and yet in which the capacitance caused by long lead wires to the sensing capacitor does not change the balance of the circuit.

Briefly, this is accomplished by providing a high gain amplifier which is roughly tuned so that the gain peaks at about 5 kilocycles, and a feedback network in the form of capacitance bridge coupled to the output of the amplifier. The output of the amplifier is split into two oppositely phased voltages one of which is connected to the sensing capacitor and the other connected to a reference capacitor. The feedback network is adjusted so that the signal from the sensing capacitor equals the signal from the reference capacitor and no net feedback to the input of the amplifier occurs while the sensing capacitor is immersed in fluid. When however, the impedance of the sensing capacitor changes due to air replacing the fluid as a dielectric, the net feedback becomes positive and the amplifier oscillates. A relay is coupled to the output of the amplifier so that upon oscillation, an indication is given that the fluid has reached a predetermined level. Since the sensing capacitor is part of a capacitance bridge network, any capacitance due to long lead wires does not change the operation point.

Figure 2:
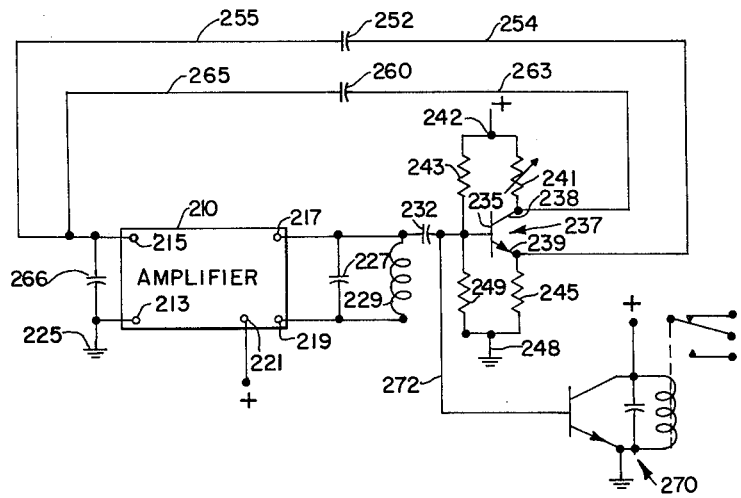

A more complete understanding of the invention will be obtained upon examination of the following specification, claims and drawings in which, FIGURE 1 is a schematic representation of one embodiment of the present invention, and
FIGURE 2 is a schematic representation of an alternate embodiment of the present invention.

In FIGURE 1, a high gain two stage direct coupled transistor amplifier 10 is shown in a dashed line box. Amplifier 10 has a pair of input terminals 13 and 15, a pair of output terminals 17 and 19 and a supply input terminal 21. Input terminal 13 is connected to a point of reference potential such as ground connection 25, output terminals 17 and 19 are connected to the opposite electrodes of a capacitor 27 which is connected in parallel with a primary winding 28 of a transformer 29, and supply terminal 21 is connected to the positive terminal of a source of direct voltage such as battery 33 the negative terminal of which is connected to ground at 35. Capacitor 27 and the primary winding 28 act to tune the amplifier so that its gain peaks at a desired frequency.

Amplifier 10 includes a first stage NPN transistor 40 having a base 41 connected to input terminal 15, an emitter 43 connected to ground by way of a conductor 44 and input terminal 13, and a collector 45. Collector 45 is connected to battery 33 by means of a resistor 47, a conductor 48 and a conductor 49 connected to supply terminal 21. Resistor 47 provides the collector load for transistor 40. Resistor 47 and conductor 48 also connect collector 45 to output terminal 19. A second stage NPN transistor 50 has a base 51 connected to the collector 45 of transistor 40, an emitter 53, and a collector 55 connected to output terminal 17 by a conductor 56. Emitter 53 is connected to ground by means of a conductor 57, a parallel combination of a resistor 59 and a capacitor 60, and a conductor 62 connected to input terminal 13. Emitter 53 is also connected to the base 41 of transistor 40 by means of conductor 57, a conductor 65 and a resistor 67. The combination of resistors 59 and 67 provide forward bias for the first stage transistor 40 and allow direct current feedback for stabilization while capacitor 60 prevents A.C. degenerative feedback.

While amplifier 10 has been described particularly, it should be realized that other amplifiers may be employed and that alterations in the circuitry to fit particular circumstances will be obvious to one skilled in the art.

Transformer 29 has a first secondary winding 75 and a second secondary winding 76. A potentiometer resistance winding 79 is connected across the end terminals of secondary winding 75 and a movable wiper 81 connected to ground at 83 is operable to move along the resistance winding 79. Wiper 81 is positioned by an adjusting knob 85 acting through a mechanical linkage drawn as dashed line 86. The voltages appearing at the ends of secondary winding 75 thus have opposite phase and have magntiudes depending on the position of wiper 81 on resistance winding 79 as well as the magnitude of the output from amplifier 10. A sensing capacitor 90 is mounted at a predetermined level in a tank of fluid 91 and has one electrode connected to the lower end of resistance winding 79 by a conductor 93 and the other electrode connected to the input terminal 15 of amplifier 10 by a conductor 95. A reference capacitor 97 has one electrode connected to the upper end of resistance winding 79 by a conductor 98 and the other electrode connected to the input terminal 15 of amplifier 10 by a conductor 99. It will be noted that the oppositely phased voltages from the end terminals of secondary winding 75 are applied to the sensing capacitor 90 and the reference capacitor 97 respectively so that oppositely phased signals from the sensing capacitor 90 and the reference capacitor 97 are produced. These signals are joined to the input of amplifier 10 so that they subtract. The capacitances which may occur due to long connecting wires 93 and 95 are shown in phantom as capacitors 101 and 103, each connected from one side of the sensing capacitor 90 to ground at 105 and 107 respectively. It should be noted that neither capacitor 101 nor capacitor 103 acts in shunt with sensing capacitor 90 but rather capacitor 101 is in parallel with the upper half of resistance winding 79 while capacitor 103 is effectively across the input terminals 13 and 15 of amplifier 10. An additional capacitance 110 is placed across the input terminals 13 and 15 to assure that the input impedance of the amplifier 10 is reactive.

The secondary winding 76 of transformer 29 is connected between a base 117 and an emitter 118 of an NPN transistor 119 by means of conductors 120 and 122 respectively. The emitter 118 is connected to ground at 125 and a collector 127 is connected to a parallel combination of capacitor 129 and a relay winding 131 by a conductor 133. The other sides of capacitor 129 and relay winding 131 are connected to the positive terminal of a battery 136 by means of a conductor 138. The negative terminal of battery 136 is connected to ground at 139. Of course, the relay 131 and capacitor 129 could be connected to the same battery 33 used to supply amplifier 10 and a separate battery is shown only for convenience in drawing. Relay winding 131 is operative to position a switch arm 141 of a switch 143 by means of a connection shown as dashed line 146. Operation of switch 143 provides an indication that fluid has reached a predetermined level, as will be shown.

When it is desired that the system operate as fluid falls below the electrodes of sensing capacitor 90, potentiometer wiper 81 is set so that the signal produced by sensing capacitor 90 is equal to the signal produced by reference capacitor 97 when sensing capacitor 90 is submerged. This is the balance condition since there is cancellation of these oppositely phased signals and there is no net feedback to the amplifier. When the fluid in container 91 falls below the predetermined level, the impedance of sensing capacitor 90 changes and the signal through this capacitor also changes so that the two oppositely phased signals from sensing capacitor 90 and reference capacitor 97 no longer cancel and positive feedback results. When the system is thus unbalanced, oscillation is started by any of the constantly occurring extraneous signals from amplifier 10. These signals are produced from a variety of miscellaneous sources and they appear as small voltages across primary winding 28 of transformer 29. Secondary winding 75 receives the small voltages and presents them to the sensing capacitor 90 and reference capacitor 97 to produce the positive feedback to the input terminal 15. The feedback signal is amplified which increases the output of amplifier 10 and the process is repeated to cause oscillation.

When amplifier 10 has been caused to oscillate, the voltage on secondary winding 76 thus produced switches transistor 119 to an "on" condition thereby allowing current to flow from battery 136 through relay winding 131 to ground at 125. Relay winding 131 causes switch arm 141 to move thus creating a signal informing the operator that the predetermined level of fluid has been reached in container 91.

Of course if desired, the polarity of the voltages applied to sensing capacitor 90 and reference capacitor 97 could be reversed and the system balanced when sensing capacitor 90 is in air. Under these conditions the system would provide positive feedback when sensing capacitor 90 was submerged in fluid and oscillation would occur indicating that the fluid had raised to the predetermined level in the tank 91.

The following components have been found to produce an operative system:

| | |
|---|---|
| Transistors 40 and 50 | 2N335 Texas Instruments Co. |
| R47 | 10K ohms. |
| R59 | 2K ohms. |
| R67 | 100K ohms. |
| C27 | 300 $\mu\mu$ farads. |
| C60 | 60 $\mu\mu$ farads. |
| C110 | .01 $\mu$ farad. |
| Resistive winding 79 | 20K ohms. |
| Sensor 90 | 7 $\mu\mu$ farads. |
| Transistor 119 | 2N335 Texas Instruments Co. |
| Capacitor 129 | .1 $\mu$ farad. |
| Reference 97 | 10 $\mu\mu$ farads. |
| Relay 131 | 2500 ohms 3.2 ma. |
| Batteries 33 and 136 | 22.5 volts. |
| Transformer 29 impedance ratio, winding 28:75 | 20K:10K ohms. |
| Transformer 29 impedance ratio, winding 28:76 | 20K:1K ohms |

In FIGURE 1, the transformer 29 was used to convert the output from amplifier 10 into two oppositely phased voltages. Other types of phase splitters may be utilized and FIGURE 2 shows one such alternate system.

Referring to FIGURE 2, an amplifier 210 is shown having a pair of input terminals 213 and 215, a pair of output terminals 217 and 219 and a supply terminal 221. Amplifier 210 may be of the same type as amplifier 10 of FIGURE 1. Input terminal 213 is connected to ground at 225, output terminals 217 and 219 are connected to the opposite electrodes of a capacitor 227 which is connected in parallel with a coil 229, and supply terminal 221 is connected to the positive terminal of a source of direct voltage. The capacitor 227 and coil 229 operate to tune the amplifier so that its gain peaks at the desired frequency. One electrode of a direct current blocking capacitor 232 is connected to the upper terminal of coil 229 and the other electrode is connected to a base 235 of an NPN transistor 237. Transistor 237 also has a collector 238 and an emitter 239. A variable resistor 241 is connected between the collector 238 and the positive terminal 242 of a direct voltage source and a resistor 243 is connected between the base 235 and the positive terminal 242. A resistor 245 is connected between the emitter 239 and a ground connection 248 and a resistor 249 is connected between the base 235 and the ground connection 248. A sensing capacitor 252 is connected between the emitter electrode 239 and the input terminal 215 of amplifier 210 by means of conductors 254 and 255 and a reference capacitor 260 is connected between the collector electrode 238 and the input terminal 215 of amplifier 210 by means of conductors 263 and 265. A capacitor 266 is connected across the input terminals 213 and 215 to assure that the input impedance to amplifier 210 is reactive.

When the net feedback to the amplifier is zero, there is no output from the amplifier and hence a balanced condition exists. When positive feedback occurs, the sinusoidal output of amplifier 210 first drives the base 235 positive making the voltage on the emitter 239 more positive and making the voltage on the collector 238 more negative with respect to ground. As the output from the amplifier 210 swings to the negative half cycle, the base 235 becomes negative causing the voltage on collector 238 to become positive and the voltage on the emitter 239 to become negative with respect to ground. Thus, the voltages on the collector and the emitter are oppositely phased and these voltages are presented to the sensing capacitor 252 and the reference capacitor 260 in the same manner as described with respect to FIGURE 1. A relay system 270 is connected to the base 235 of transistor 237 by a conductor 272 to provide an indication as in FIGURE 1.

Many modifications will occur to those skilled in the art. For example, instead of using the potentiometer 79—81 to establish equal signals through capacitors 90 and 97, the transformer secondary 75 could be center tapped to ground and the reference capacitor 97 could be made manually variable to balance the signals through the capacitors. Also instead of using relay switch 143 and winding 131 to provide a signal, a second stage transistor could be used or any alternate signaling device such as a light or buzzer could be substituted. I therefore do not intend to be bound by the specific apparatus here described but only limited by the appended claims.

I claim:

1. Fluid level sensing apparatus comprising, in combination: a sensing capacitor having a first and a second electrode mounted at a predetermined level in a container of fluid and having a first capacitance value when submerged in the fluid and a second capacitance value when the fluid has dropped below the predetermined level; a reference capacitor having a first and a second electrode; conductor means connecting the first electrodes of said sensing and reference capacitors; a potentiometer having a movable wiper connected to a point of reference potential and having a resistance winding connected between the second electrodes of said sensing and reference capacitors to form a bridge having an output between said conductor means and the point of reference potential; transformer means having a primary winding and having a secondary winding connected across the resistance winding to supply the bridge with a source of energy; an amplifier having a first input terminal connected to the point of reference potential, a second input terminal and an output; means connecting the primary winding of said transformer to the output of said amplifier so that the secondary winding of said transformer supplies energy to the bridge whenever said amplifier produces an output; means connecting said conductor means to the second input terminal of said amplifier so that an input signal is presented to said amplifier when the bridge is unbalanced which signal is amplified to increase the energy to the bridge and cause the system to oscillate; and means connected to said amplifier and operable when the system oscillates to indicate the predetermined level of fluid in the container.

2. Fluid level sensing apparatus comprising, in combination: an amplifier having an input and a pair of output terminals, said amplifier operating on a signal at the input to create an amplified signal at the output terminals; first means connected to the output terminals to produce a first and a second voltage of opposite phase and of magnitude which varies with the signal at the output terminals; a sensing capacitor mounted at a predetermined level in a container of fluid and having a first capacitance value when submerged in the fluid and a second capacitance value when not submerged; means connecting said sensing capacitor to said first means to impress the first voltage on said sensing capacitor to produce a first signal having a first phase; a reference capacitor; means connecting said reference capacitor to said first means to impress the second voltage on said reference capacitor to produce a second signal of phase opposite the first phase; means connecting said sensing capacitor and said reference capacitor to the input of said amplifier so that the first signal from the sensing capacitor is opposed by the second signal from the reference capacitor; and means connected to said amplifier to indicate when a signal is present at the input of said amplifier to indicate the predetermined level of fluid in the container.

3. Fluid level sensing apparatus comprising, in combination: an amplifier having an input and an output; a feedback network connecting the output to the input and causing said amplifier to oscillate whenever a signal of a first phase is fed back to the input, said feedback network comprising a potentiometer having a movable wiper connected to a source of reference potential and a resistance winding connected to receive the output of said amplifier, a sensing capacitor mounted at a predetermined level in a container of fluid connected between one end of the resistance winding and the input of said amplifier to cause a signal of the first phase which is of a first magnitude when the sensing capacitor is submerged in fluid and of a second magnitude when not submerged to flow thereto, a reference capacitor connected between the other end of said resistance winding and the input of said amplifier to cause a signal of phase opposite to the first phase and of the first magnitude to flow thereto, the signal from the reference capacitor opposing substantially all of the signals from the sensing capacitor when the sensing capacitor is submerged but allowing a signal of the first phase to be present to said amplifier when the sensing capacitor is not submerged; and means connected to said amplifier to indicate the condition of oscillation and thus the predetermined level of fluid in the container.

4. Apparatus of the class described comprising, in combination: an amplifier having first and second input terminals and a pair of output terminals; means connecting the first of the input terminals of said amplifier to a point of reference potential; a transformer having a primary winding connected across the output terminals of said amplifier and having a secondary winding with first and second end terminals; a sensing capacitor having spaced electrodes and having an impedance which varies with the existence of fluid between the electrodes; a reference capacitor; means connecting one electrode of said sensing capacitor to the first end terminal of the secondary winding of said transformer; means connecting one electrode of said reference capacitor to the second end terminal of the secondary winding of said transformer; means connecting the other electrode of said sensing capacitor to the other electrode of said reference capacitor to form a first junction; means maintaining a portion of the secondary of said transformer intermediate the end terminals at the reference potential; a third capacitor; means connecting said third capacitor between the first junction and a point at the reference potential; and means connecting the first junction to the second input terminal of said amplifier.

5. Fluid level sensitive device comprising, in combination: a sensing capacitor mounted at a predetermined level in a container of fluid; a reference capacitor; means connecting said sensing capacitor and said reference capacitor to form a first junction; a potentiometer having a movable wiper and a resistance winding with first and second end terminals; means connecting the first end terminal to said sensing capacitor and connecting the second end terminal to said reference capacitor; means connecting the movable wiper to a point of reference potential; a transformer having a primary winding and a secondary winding; means connecting the secondary winding between the first and second end terminals; an amplifier having a first input terminal connected to the point of reference potential, a second input terminal and an output; means connecting the output to the primary winding; and means connecting the first junction to the second input terminal.

6. Apparatus of the class described comprising, in combination: an amplifier having an input and an output; feedback means connecting the output to the input of said amplifier to cause oscillations when feedback of a first phase occurs, said feedback means comprising a capacitance network having a pair of input terminals connected to the output of said amplifier, a first capacitor located in a container of fluid and having a first capacitance when subjected to a first fluid level condition and a second capacitance when subjected to a second fluid level condition, means connecting the first capacitor in the network to produce a first current of a first phase and of a first or second magnitude depending on the fluid level condition to which the first capacitor is subjected, a second capacitor connected in the network to produce a second current of phase opposite the first phase and of the first magnitude, means joining the first and second capacitors to form a first junction so that the first and second currents subtract; and means connecting the first junction to the input of said amplifier.

7. Apparatus of the class described comprising, in combination: a transformer having a primary winding and a secondary winding, the secondary winding having a pair of end terminals and a portion intermediate the end terminals maintained at a reference potential; a capacitance network having a pair of input terminals connected to the end terminals of the secondary winding, a first capacitor having spaced electrodes and having an impedance which varies with the presence or absence of fluid between the electrodes, a second capacitor connected in series with said first capacitor to form a first junction, means connecting the series connected first and second capacitors between the input terminals of said network; an amplifier having a first input terminal connected to a point at the reference potential, a second input terminal and a pair of output terminals; means connecting the output terminals across the primary winding of said transformer; and means connecting the first junction to the second input terminal of said amplifier.

8. Apparatus of the class described comprising, in combination: a capacitance network having a pair of input terminals, a first branch including a first capacitor having spaced electrodes for producing a first current of a first phase and of a magnitude variable with the presence or absence of fluid, between the electrodes, a second branch including a second capacitor for producing a second current of a phase opposite the first phase; means connecting the first and second branches to form a first junction; an amplifier having an input and an output; means connecting the output of said amplifier to the input terminals of said capacitance network; and means connecting the first junction to the input of said amplifier.

9. Apparatus of the class described comprising, in combination: an amplifier having a first input terminal connected to a point of reference potential, a second input terminal and an output; a transformer having a primary winding connected to receive the output of said amplifier and having a secondary winding; means maintaining an intermediate portion of said transformer at the reference potential; a first capacitor having spaced electrodes and having an impedance which varies with a change of dielectric between the electrodes; a second capacitor connected in series with said first capacitor to form a first junction, said first and second capacitors connected across the secondary of said transformer; and means connecting the first junction between the series connected capacitors to the second input terminal of said amplifier.

10. Apparatus of the class described comprising, in combination: an amplifier having a first input terminal connected to a point of reference potential, a second input terminal and an output; a transistor having base, emitter and collector connections; means connecting the base connection to the output of said amplifier; a first pair of impedances connected in series between the emitter and the base connections; means connecting the junction of said first pair of impedances to the point of reference potential; a second pair of impedances connected in series between the collector and base connections; means connecting the junction of said second pair of impedances to a source of voltage; a first capacitor having spaced electrodes connected between the collector connection and the second input terminal of said amplifier to produce a first signal of a first phase and of a first or second magnitude dependent upon the existence of fluid between the electrodes; and a second capacitor connected between the emitter connection and the second input terminal of said amplifier to produce a second signal of phase opposite said first phase and of said first magnitude, said first and second signals combining to provide said amplifier with positive feedback sufficient to cause oscillation only when said first signal is of said second magnitude.

11. Oscillator apparatus for indicating the level of fluid in a container comprising, in combination: an amplifier having an input and an output; feedback means operable in accordance with a predetermined fluid level to present a signal to the input of said amplifier of magnitude dependent on the output of said amplifier and of proper phase to cause oscillation, said feedback means comprising phase splitting means connected to the output to derive a first and a second voltage of opposite phase and of magnitude dependent on the output of said amplifier, a sensing capacitor mounted in the container and having a first impedance when submerged in fluid and a second impedance when not submerged in fluid, means connecting said sensing capacitor to said phase splitting means so that the first voltage is presented to said sensing capacitor to develop a first signal of a first phase and of magnitude dependent upon the impedance of said sensing capacitor, a reference capacitor, means connecting said reference capacitor to said phase splitting means so that the second voltage is presented to said reference capacitor to develop a second signal of phase opposite the first phase, means connecting said sensing capacitor and said reference capacitor to the input of said amplifier so that the first and second signals subtract to present a resultant signal to said amplifier, the resultant signal being normally substantially zero but upon change of impedance of said sensing capacitor the resultant signal being sufficient to cause oscillation.

12. Apparatus of the class described comprising, in combination: an amplifier having an input and an output; phase splitting means connected to the output of said amplifier to derive a first and a second voltage of opposite phase and of magnitude dependent upon the output of said amplifier; a sensing capacitor having a first impedance when submerged in a fluid and a second impedance when not submerged in the fluid; means connecting said sensing capacitor to said phase splitting means so that the first voltage is presented to said sensing capacitor to produce a first signal of a first phase and of magnitude dependent upon the impedance of said sensing capacitor; a reference capacitor; means connecting said reference capacitor to said phase splitting means so that the second voltage is presented to said reference capacitor to produce a second signal of phase opposite the first phase; means connecting said sensing capacitor and said reference capacitor to the input of said amplifier so that the sum of the first and the second signal is presented thereto; and means connected to the output of said amplifier and operable in accordance with the output thereof to indicate the presence or absence of fluid in the sensing capacitor.

13. Apparatus for use with first and second capacitors the first of which has a fixed value and the second of which is arranged to be mounted at a predetermined level in a container so that its capacitance changes from a first value to a second value when the level of fluid in the container passes the predetermined level comprising, in combination: an amplifier having an input terminal for connection to one electrode of each of the capacitors and an output; phase splitting means connected to the output and having a first terminal for connection to the other electrode of the first capacitor and a second terminal for connection to the other electrode of the second capacitor, said phase splitting means operable upon the occurrence of a signal at the output of said amplifier to produce a first signal of a first phase on the first terminal, and a second signal of phase opposite the first phase on the second terminal, the first signal producing a negative feedback signal through the first capacitor and the second signal producing a positive feedback signal through the second capacitor, the magnitudes of the positive and negative feedback signals being such that net positive feedback causing oscillations results only when the first capacitor is of the second value; and further means connected to the output of said amplifier and operable to produce a control signal upon the occurrence of oscillations.

14. In combination: a feedback amplifier capable of oscillation in the presence of substantial positive feedback; means for deriving from the output of said amplifier positive and negative feedback voltages; a negative feedback loop for said amplifier adapted to comprise a fixed feedback capacitor; a positive feedback loop for said amplifier adapted to include a sensing capacitor whose capacitance passes through a predetermined value upon the occurrence of a predetermined condition, so that the positive feedback exceeds the negative feedback upon the occurrence of said condition; and output means energized upon the occurrence of the resulting oscillation of said amplifier.

References Cited in the file of this patent

UNITED STATES PATENTS

| | | |
|---|---|---|
| 2,173,427 | Scott | Sept. 19, 1939 |
| 2,435,880 | Eilenberger | Feb. 10, 1948 |
| 2,541,743 | Brockman et al. | Feb. 13, 1951 |
| 2,563,281 | Griffith | Aug. 7, 1951 |
| 2,775,892 | Godde | Jan. 1, 1957 |
| 2,782,311 | Colander et al. | Feb. 19, 1957 |
| 2,908,166 | Johnson | Oct. 13, 1959 |
| 2,943,266 | Belland | June 28, 1960 |
| 2,945,165 | Franzel | July 12, 1960 |

FOREIGN PATENTS

| | | |
|---|---|---|
| 349,496 | Great Britain | May 22, 1931 |
| 353,627 | Great Britain | July 30, 1931 |

OTHER REFERENCES

Crowhurst: "Audio Oscillator Circuits, Old and New," Audio, July 1959, pages 25, 26, 58 and 59 relied on.